United States Patent Office 2,876,894
Patented Mar. 10, 1959

2,876,894

ADHESIVE TAPES AND LINERS HAVING LOW-ADHESION COATINGS

Carl A. Dahlquist, Roseville, Arthur H. Ahlbrecht, White Bear Township, Ramsey County, and George M. Dixon, St. Paul, Minn., assignors to Minnesota Mining & Manufacturing Company, St. Paul, Minn., a corporation of Delaware No Drawing. Application August 1, 1955
Serial No. 525,782

7 Claims. (Cl. 206—59)

This invention relates to the discovery of a novel and effective low-adhesion backsize coating for normally tacky or pressure-sensitive adhesive tapes, which permits the tape to be unwound from the roll with considerably less force. The invention provides improved adhesive tapes characterized by being backsized with the novel low-adhesion coating. The invention also provides improved liners for adherent surfaces generally.

While not limited thereto, the invention provides low-adhesion coatings highly suitable for non-fibrous cellulosic films (such as films of cellophane and of cellulose acetate), which strongly bond to the cellulosic substrate and yet provide an outer surface that is hydrophobic and that has a substantially lower degree of adhesion toward contacting adhesives than does the cellulosic substrate when uncoated. The present backsizing is eminently suited for use in the manufacture of pressure-sensitive adhesive tapes having a backing film of cellophane or cellulose acetate.

It has been discovered that extremely thin low-adhesion coatings having the desired combination of properties can be conveniently formed by coating and drying a solution of a solid copolymer of a vinyl monomer of the class consisting of higher-alkyl vinyl esters and ethers and a maleic monomer of the class consisting of maleic acid and the half-esters and half-amides thereof. These copolymers are solid at room temperature. By "higher-alkyl" it is meant that the vinyl monomer has a terminal long-chain alkyl group having a length of at least 10 carbon atoms. These alkyl groups provide long hydrocarbon "tails" attached as terminal side chain groups in the polymer structure. The copolymer molecules include carboxyl groups.

A convenient procedure for preparing the low-adhesion carboxylic copolymer product is to copolymerize the vinyl ester or ether monomer with maleic anhydride to obtain an intermediate copolymer which is then treated so as to open the anhydride rings and form the corresponding dicarboxylic acid structure or the monocarboxylic half-ester or half-amide derivative; thus in effect "carboxylating" the anhydride groups. This approach has practical advantages as compared to directly preparing the product polymer by copolymerizing the vinyl ester or ether with maleic acid or a half-ester or half-amide thereof. The intermediate maleic anhydride copolymer can be hydrolyzed (reacted with water) to form the corresponding dicarboxylic acid type of copolymer; or treated with an alcohol to form the half-ester type of derivative; or treated with an amine to form the half-amide type of derivative. Treatment with ethanolamine illustrates treatment with a bifunctional compound that is both an alcohol and an amine and is believed to result predominately in the formation of a hydroxy half-amide type of derivative. The use of polyfunctional reactants results in some cross-linking between polymer chains, serving to increase the molecular weight. This occurs, for example, when ethylene glycol is employed, which results in the formation of hydroxy half-ester structures, and also in cross-linking of polymer molecules that can increase the molecular weight by several times.

The "vinyl" ester or ether monomers may be of the simple vinyl type (such as vinyl stearate and vinyl octadecyl ether) or a homologous vinyl type, such as an allyl ester or ether (it being noted that the allyl radical includes a vinyl radical and hence provides a vinyl structure.

The compositional structure of these copolymers is indicated by the following equation for a preferred species made by copolymerizing allyl stearate and maleic anhydride followed by hydrolysis to introduce carboxyl groups. The left-hand formula shows two adjacent units of the copolymer chain molecule, the upper being contributed by the allyl stearate monomer and the lower by the maleic anhydride monomer. The right-hand formula shows the corresponding hydrolyzed product wherein the maleic anhydride unit has been carboxylated to provide a dicarboxylic maleic acid structure, which is the same as would have provided by copolymerization of the vinyl monomer with maleic acid.

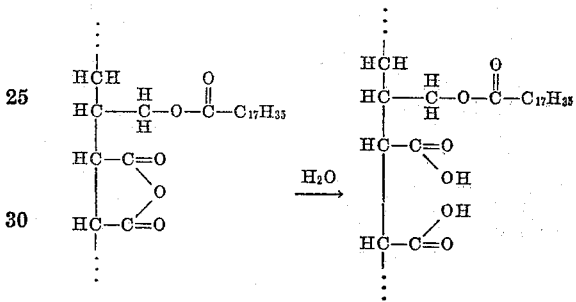

In the carboxylic copolymer chain there are a large number of alternating ester and acid units. It is not necessary that all of the anhydride units be carboxylated; a desirable product being formed even when only about half of the anhydride units have been hydrolyzed, the resulting copolymer product being a terpolymer of allyl stearate, maleic anhydride and maleic acid.

A further illustrative example is the copolymer of vinyl stearate and maleic anhydride which has been alcoholyzed by treatment with methyl alcohol to form the half-ester type of product polymer.

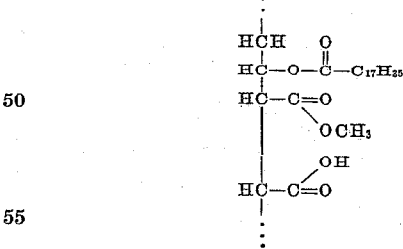

A 1:1 of copolymer is preferred, which means that the vinyl and maleic monomers are copolymerized in equal mole ratio. The bulk polymer masses are hard, brittle, glassy solids having an unctuous feel.

It is critical that the alkyl side chains contributed by the vinyl compound have a length of at least 10 carbon atoms, in order to obtain the desired low-adhesion effect. This minimum chain length results in copolymers capable of usefully serving as low-adhesion coatings to provide a release action for some normally tacky or pressure-sensitive adhesives, including pressure-sensitive acrylate polymers employed as tape adhesives. The preferred alkyl chain length is 16 to 22 carbon atoms for general usage, since an optimum low-adhesion release action for certain types of rubber-resin pressure-sensitive tape adhesives (such as those compounded of natural rubber and rosin-derivative tackifiers) is not obtained when the chain length is less than 16 carbon atoms. Chain lengths greater than 22 carbon atoms would be useful were it not for the unavailability of monomer starting compounds at a reasonable cost. The preferred vinyl monomer starting compounds are allyl stearate, vinyl stearate and vinyl octadecyl ether; the first two provide alkyl chains having 17 carbon atoms and the third provides alkyl chains having 18 carbon atoms. These are available at a reasonable cost warranting commercial usage in making low-adhesion copolymers.

A very desirable feature of the present copolymer material is that it can be coated either from a solution in a volatile organic solvent or from an aqueous dispersion. The latter is advantageous as costs are lowered and fire hazards are avoided. The material is soluble in inexpensive solvents such as ethyl acetate, toluene, mixtures of ethyl acetate and toluene, and methyl ethyl ketone. It is insoluble in aliphatic hydrocarbon solvents (such as heptane) and in highly polar solvents such as methyl and ethyl alcohol.

This type of copolymer can be coated on flexible sheet materials to provide tightly bonded surface films of microscopic thinness, which are highly colorless and transparent. These extremely thin coating films have properties different from the bulk properties of the material, due to orientation of molecules and to the extremely high ratio of surface area to the third dimension of thickness. They are very flexible, despite the fact that the bulk polymer is a brittle, glassy solid. The extreme thinness of the coating makes for a more tenacious bonding and prevents it from cracking, rupturing or flaking when the coated sheeting is bent at a sharp angle or creased.

Cellulosic films and other sheet materials having a smooth non-porous surface can readily be coated by squeeze roll procedure with a solution having a 2 to 10% solids content of the copolymer to result (after drying) in a continuous low-adhesion copolymer coating having a weight of about one pound per 20,000 square yards, and a thickness of the order of a millionth of an inch. Thus the cost per unit area is quite low. When coated with pressure-sensitive tape adhesive on the reverse (face) side, and slit and wound into rolls, an adhesive tape product results which can be unwound with much less effort, even after long standing and even when the tape roll has been subjected to higher than normal temperatures (such as may be encountered during warehouse storage or shipment, in very hot weather, or by being stored near hot steam radiators or pipes).

A valuable feature of pressure-sensitive adhesive tapes of the present type is that there is no marked increase in the unwind effort when the rolls are subjected to low temperatures (0° C. and even lower). Pressure-sensitive tape adhesives in general become more aggressively tacky at subnormal temperatures, so that rolls of tape not provided with a low-adhesion backsize become hard to unwind at low temperatures. This undesirable effect is overcome by use of the present low-adhesion backsize.

The effectiveness of a proposed low-adhesion coating cannot be judged merely on the basis of initial performance at room temperature of a recently made roll of pressure-sensitive adhesive tape. Many types of coatings provide a very low initial adhesion but entirely lose this property after a few days or weeks of contact with the pressure-sensitive adhesive, and may even increase the force required to unwind the tape. Others, while satisfactory at normal room temperature, fail when subjected to elevated temperatures such as are encountered in trade usage. Many types of coatings cause progressive loss of tack of the pressure-sensitive adhesive so that the tape becomes substandard or even worthless in a relatively short period. Some coatings develop an affinity for the contacting adhesive to the point where they are stripped off when the tape is unwound, thereby masking the adhesive surface of the unwound tape, or produce this result in any event, in consequence of inadequate anchorage to the substrate on which coated. The present low-adhesion coatings do not suffer from these defects.

The proportional reduction in relative unwind force of pressure-sensitive adhesive tapes having a low-adhesion backsize, depends somewhat upon the particular adhesive employed in making the comparison. In any given case it is substantially independent of the rate of unwind until a high unwind value is reached at which the low-adhesion coating "lets go" of the adhesive and the tape can then be unwound with even less effort. This last feature is an advantage when tape is unwound at high speeds in certain types of machines.

The reduced unwind effort not only facilitates removing tape from rolls but has the great advantage of reducing the possibility of the tape breaking or tearing, which is of particular importance when the tape backing is a thin, nonfibrous, cellulosic film, such as cellophane or cellulose acetate.

A further advantageous feature of the present backsize is that it provides a hydrophobic (water-repellent) back surface for cellophane tape backings rendering them waterproof. Normal or "plain" cellophane (regenerate cellulose film softened with glycerine or the like) has a hydrophilic surface readily wet by water and the film quickly becomes soft and weak when in contact with water. The commercially available moisture-proofed or waterproofed cellophane films having a coating that tends to delaminate when subjected to the forces encountered when a roll of film-backed pressure-sensitive adhesive tape is unwound from a roll, especially when the roll has been subjected to high humidity conditions causing absorption of moisture into the cellophane film through the exposed edges and a consequential weakening of the bond between the coating and the film. The present low-adhesion backsize coating provides a waterproof coating that is tenaciously bonded to the cellophane and is not stripped off even when the adhesive tape has been subjected to humid atmospheric conditions for prolonged periods before unwinding. The backsize thus has a valuable waterproofing function in addition to its low-adhesion function in the manufacture of pressure-sensitive adhesive tapes having cellophane backings.

The fibrous paper types of backings such as are commonly employed in pressure-sensitive masking tapes, are generally unified by pre-impregnation with a material adapted to bind the fibers together so as to prevent splitting or delamination of the paper under the strong force exerted upon the paper when aggressively tacky tape is unwound from rolls thereof. The impregnant material provides a surface filler coating upon which the present low-adhesion backsize coating can be applied so as to reduce the force required for unwinding the tape. An interposed sizing coating can be applied to the back surface of the impregnated paper so as to reduce the amount of low-adhesion copolymer needed for filming the back surface of the tape—such as, for example, a coating of glue or casein (which may be insolubilized in situ with formaldehyde), or shellac, or a cellulose derivative (such as ethyl cellulose or cellulose acetate), or an alkyd resin. The unwinding force can be so substantially reduced that a less strongly unified paper backing can be employed. In fact paper-backed pressure-sensitive adhesive tapes can be made in which there is no need for impregnation, as by using a fairly thin and dense type of highly calendered paper. The present low-adhesion backsize coating may be employed on other types of fibrous tape backings, such as felted and woven backings made from textile fibers, which are preferably sized on the back so as to bind the fibers and reduce the amount of low-adhesion backsize material which is needed.

A further illustrative use of the invention is in providing low-adhesion surface coatings on both sides of film, paper or cloth liners that are wound into rolls of double-coated pressure-sensitive adhesive tapes (which are tacky on both sides) to prevent bonding together of successive convolutions. Low-adhesion liners are also useful as spacers to separate sheets that are stacked and which have adherent surfaces tending to block together if permitted to contact each other.

Liners having a low-adhesion surface sizing are also useful as supports for mounting pressure-sensitive adhesive labels, surgical adhesive tape strips, tacky bandages, corn plasters, etc.

The term "liner," as broadly used in the claims, includes not only liners in the strict sense (as just described) but also the backings of tacky adhesive tapes (since the latter function in part as liners when the tape is wound into rolls or stacked in sheets).

PREPARATION OF THE COPOLYMERS

As previously mentioned, the most convenient route to the carboxylic copolymer products employed in practicing the invention, is to prepare an intermediate copolymer of the vinyl ester or ether with maleic anhydride, and then convert to the carboxylic type by suitable treatment. The product can be furnished either as a solution in an organic solvent or as a dispersion in water for use in coating desired surfaces, and is generally thinned down to a solids (polymer) concentration of 2 to 10% to provide a coatable viscosity and to permit of obtaining extremely thin coatings.

The following experimental examples illustrate suitable procedures for preparing the desired carboxylic copolymers.

Example 1

This example relates to low-adhesion carboxylic copolymers prepared from allyl stearate and maleic anhydride as starting monomers.

The apparatus was a 1000 ml. 3-neck flask equipped with a stirrer, reflux condenser, thermometer and nitrogen supply. The following recipe was used:

| | Grams |
|---|---|
| Allyl stearate | 200 |
| Maleic anhydride | 61 |
| Toluene (solvent) | 175 |
| Benzoyl peroxide (catalyst) | 2.6 |

The flask was charged with the monomers (present in equimolar ratio) and 155 grams of toluene, and was placed in a water bath heated so as to raise the temperature of the mixture to 90° C. A small flow of nitrogen was bubbled through the mixture for 10 minutes and subsequently as the flask was cooled to 60° C., serving to drive off dissolved oxygen. The benzoyl peroxide dissolved in 20 grams of toluene was added, the temperature was raised to 70° C., and the nitrogen flow was stopped. The temperature was held at 70° C. for 18 hours; raised to 90° C. and held for one hour; and then the batch was cooled to room temperature and diluted with toluene to a 35% solids content (by weight).

A 200 gram portion of the solution was poured slowly into 1500 ml. of methyl alcohol with vigorous stirring. The copolymer separated as a white, flocculent product. It was separated by filtration, washed with an additional 1500 ml. of methyl alcohol on the filter, and vacuum dried. The yield of this methanol-insoluble copolymer product was 85% of the total monomer charge. The saponification equivalent was approximately 141, indicating that the polymeric molecules were formed from the monomers in a 1:1 mole ratio.

This intermediate copolymer of allyl stearate and maleic anhydride was alcoholyzed with ethylene glycol to provide a carboxylic half-ester copolymer end product, as follows: 10 grams of ethylene glycol was added to 100 grams of a 60% solution in toluene of the allyl stearate:maleic anhydride copolymer. The temperature was raised to 90° C. and held for 5 hours, followed by cooling to room temperature. The solution was hazy at first but cleared as the glycol reacted. There was no noticeable increase of viscosity and no indication of gel formation. However, light-scattering measurements indicated an increase of average molecular weight from about 38,000 to about 151,000, showing that some cross-linking of the polymeric molecules had occurred due to the bifunctional structure of ethylene glycol which permits a molecule of the latter to react with and link together two polymer molecules.

Half-ester copolymers can similarly be prepared by alcoholysis with monohydric alcohols, which are monofunctional and do not cause cross-linking, such as methanol, ethanol, n-propanol and n-butanol.

An illustrative half-amide type of copolymer end product was prepared as follows: 50 grams of a 64.5% solution in toluene of the allyl stearate:maleic anhydride polymer was heated to 75° C. and then dropwise addition was made of 4.7 grams of ethanolamine (the stoichiometric equivalent of the maleic anhydride). The solution became very viscous and was thinned with 80 grams of toluene and stirred until clear. The temperature ranged from 75 to 90° C. The solution was cooled to room temperature. Although ethanolamine is bifunctional, there was no evidence of appreciable cross-linking of the polymer molecules. The infrared absorption spectra showed that the ethanolamine had predominately reacted as an amine rather than as an alcohol, forming a predominately half-amide type of copolymer product.

Half-amide copolymers can similarly be prepared using a wide variety of other amines, including methyl amine and ethyl amine, and by using anhydrous ammonia.

The intermediate allyl stearate:maleic anhydride copolymer can be readily hydrolyzed with water to form the dicarboxylic acid type of copolymer end product. Thus in one experiment, a 60% solution of the intermediate copolymer in toluene was diluted to 40% solids with methyl ethyl ketone. Addition was made of 5% water (based on the total solution) and the solution was refluxed for 5½ hours. It was hazy at first but cleared as the water reacted with the anhydride groups. Sodium methoxide titration indicated that about 70% of the anhydride groups were hydrolyzed; so that the product was an allyl stearate:maleic anhydride:maleic acid terpolymer type of copolymer. As previously mentioned, complete hydrolysis is not required to obtain a good low-adhesion copolymer.

Hydrolysis can also be accomplished when the copolymer is dispersed in water. Thus in one experiment, 19.4 parts of a 2.1% solution of morpholine in water was added to 20 parts of a 5% solution of the allyl stearate: maleic anhydride copolymer in a 1:1 mixture of methyl ethyl ketone and acetone. After thorough mixing the organic solvents were removed by distillation, leaving an almost transparent water dispersion of the morpholine salt of the hydrolyzed copolymer. It was shown that almost all of the anhydride groups had been hydrolyzed. When this aqueous solution is coated on a surface and is heated and dried (for example at 85° C. for 10 minutes), the morpholine is substantially eliminated and the dicarboxylic acid type of copolymer is formed in situ, namely, the allyl stearate:maleic acid copolymer.

Example 2

This example relates to low-adhesion carboxylic copolymers prepared from vinyl stearate and maleic anhydride as starting monomers.

The apparatus was a 250 ml. 3-neck flask equipped with a stirrer, reflux condenser with Barrett trap, thermometer and nitrogen supply. The following recipe was used:

| | Grams |
|---|---|
| Vinyl stearate | 50 |
| Maleic anhydride | 16 |
| Toluene | 54 |
| Benzene | 12 |
| Benzoyl peroxide | 0.6 |

The monomers, benzene, and 44 grams of toluene were charged into the flask. The solution was heated to reflux and the benzene, along with any moisture present, was removed via the trap. The solution was cooled under nitrogen to about 60° C. and addition was made of the benzoyl peroxide dissolved in 10 grams of toluene. The nitrogen flow was stopped and the temperature was raised to 70–73° C. by means of a water bath. Polymerization was indicated by an exothermic reaction which raised the temperature. The temperature was held below 80° C. by lowering the bath temperature. After the initial reaction it was necessary to supply heat to maintain the temperature between 70 and 80° C. A 5-hour reaction period was found sufficient to produce an 85% yield. The final solution had a high viscosity. (The progress of the reaction and the degree of conversion can be estimated by pouring a sample portion in at least 10 volumes of methyl alcohol with vigorous stirring and weighing the resultant alcohol-insoluble precipitate.) Neutral equivalent and saponification equivalent measurements showed that a 1:1 (equimolar) copolymer had been obtained. The inherent viscosity of the copolymer was 0.13.

A solution of the hydrolyzed copolymer in organic solvent was prepared by diluting a 50% toluene solution to 35% solids with methyl ethyl ketone, adding three times the quantity of water required for hydrolysis of the anhydride groups (13.2 parts water per 100 parts copolymer), and refluxing for 5 hours. The same result was also obtained by stirring at room temperature for one week.

Hydrolysis in aqueous dispersion was accomplished by adding 40 parts by weight of a 2% aqueous solution of morpholine to 10 parts of a 20% solution of the copolymer in acetone. The acetone was removed by distillation, leaving a clear water dispersion of the morpholine salt of the hydrolyzed copolymer. The vinyl stearate:maleic acid copolymer is formed when a coating of the solution is dried, eliminating the morpholine.

*Example 3*

This example illustrates the preparation of a low-adhesion vinyl octadecyl ether:maleic acid copolymer by hydrolysis of the copolymer of vinyl octadecyl ether and maleic anhydride.

The apparatus was of the type previously described, using a 100 ml. flask, and the following recipe was used:

| | Grams |
|---|---|
| Vinyl octadecyl ether | 15 |
| Maleic anhydride | 5 |
| Benzene | 20 |
| Benzoyl peroxide | 0.2 |

The reactants were charged into the flask and the temperature was raised to 50° C. The flask was thoroughly purged with nitrogen to flush out oxygen. The temperature was raised to 55° C. and within 10 minutes the temperature began to rise above the bath temperature due to onset of polymerization. By the time the temperature reached 62° C. the solution became very viscous and 10 grams of benzene was added as diluent and coolant. The flask temperature was maintained at 55 to 62° C. for 3 hours and then at 75–78° C. for one hour. The viscosity of the solution after cooling to room temperature exceeded "Z" on the Gardner-Holt scale. The sodium methoxide neutral equivalent value was approximately 390, showing that a 1:1 vinyl ether:maleic anhydride copolymer had been formed (the calculated value being 394).

A 35% benzene solution of this copolymer was diluted to 25% solids with methyl ethyl ketone. Addition was made of 5 ml. of water per 100 grams of solution and the mixture was refluxed for 5 hours. The solution was turbid and did not clear during hydrolysis. A 1.2 to 1 (by weight) mixture of toluene and isopropanol was added as diluent to reduce the copolymer concentration to 5%, resulting in a clear solution. Hydrolysis of the anhydride groups to produce the vinyl octadecyl ether: maleic acid copolymer was shown by the decrease in the neutral equivalent value to approximately the calculated value of 206.

An important feature of the present invention is that low-adhesion coatings are provided that retain effectiveness at elevated temperatures for prolonged periods. For example, in the case of cellophane pressure-sensitive adhesive tapes having a backsizing coating of the order of a millionth of an inch in thickness and formed of the allyl or vinyl stearate:maleic acid copolymer, and having a commercial type of pressure-sensitive adhesive coating on the other face of the cellophane backing, formed of a mixture of natural rubber, GR–S synthetic rubber and a rosin-type tackifier; it was found that the unwinding force remained constant even when the tape was subjected to a temperature of 120° F. for months, and also when subjected for many hours to a temperature of 150° F. The unwinding force was only 50 to 55% as great as the force required to unwind corresponding tape which did not have a backsizing (the cellophane back surface directly contacting the surface of the adhesive layer in the roll). There was no reduction of the adhesiveness of the tape, i. e., no adverse effect on the contacting adhesive surface.

We claim:

1. A normally tacky adhesive tape characterized by having a low-adhesion backsize coating formed of a solid copolymer of a vinyl monomer of the class consisting of higher-alkyl vinyl esters and ethers and a maleic monomer of the class consisting of maleic acid and the half-esters and half-amides thereof, the terminal alkyl group of said vinyl monomer having a length of at least 10 carbon atoms.

2. A pressure-sensitive adhesive tape wound upon itself in roll form, having a flexible backing coated on the inner face with a normally tacky pressure-sensitive adhesive and backsized with an extremely thin low-adhesion coating formed of a solid copolymer of a vinyl monomer of the class consisting of higher-alkyl vinyl esters and ethers and a maleic monomer of the class consisting of maleic acid and the half-esters and half-amides thereof, the terminal alkyl group of said vinyl monomer having a length of at least 10 carbon atoms.

3. A pressure-sensitive adhesive tape according to claim 2 wherein a rubber-resin pressure-sensitive adhesive is employed and the vinyl monomer has a terminal alkyl group having a length of 16 to 22 carbon atoms.

4. A pressure-sensitive adhesive tape wound upon itself in roll form, having a non-fibrous cellulosic film backing coated on the inner face with a normally tacky pressure-sensitive adhesive and backsized with an extremely thin low-adhesion coating formed of a solid copolymer of a vinyl monomer of the class consisting of higher-alkyl vinyl esters and ethers and a maleic monomer of the class consisting of maleic acid and the half-esters and half-amides thereof, the terminal alkyl group of said vinyl monomer having a length of at least 10 carbon atoms.

5. A pressure-sensitive adhesive tape according to claim 4 wherein a rubber-resin pressure-sensitive adhesive is employed and the vinyl monomer has a terminal alkyl group having a length of 16 to 22 carbon atoms.

6. In combination with an article having an adherent surface, a removable liner having an extremely thin low-adhesion surface coating in releasable contact with said adherent surface, said low-adhesion liner coating being formed of a solid copolymer of a vinyl monomer of the class consisting of higher-alkyl vinyl esters and ethers and a maleic monomer of the class consisting of maleic acid and the half-esters and half-amides thereof, the terminal alkyl group of said vinyl monomer having a length of at least 10 carbon atoms.

7. A non-fibrous regenerated cellulose film having an extremely thin hydrophobic low-adhesion surface coating directly bonded thereto consisting essentially of a solid copolymer of a vinyl monomer of the class consisting of higher-alkyl vinyl esters and ethers and a maleic monomer of the class consisting of maleic acid and the half-esters and half-amides thereof, the terminal alkyl group of said vinyl monomer having a length of at least 10 carbon atoms.

References Cited in the file of this patent
UNITED STATES PATENTS

| | | |
|---|---|---|
| 2,458,166 | Homeger | Jan. 4, 1947 |
| 2,532,011 | Dahlquist | Nov. 28, 1950 |
| 2,570,478 | Pitzel | Oct. 9, 1951 |
| 2,599,576 | Morris | June 10, 1952 |
| 2,721,151 | Grantham | Oct. 18, 1955 |